(12) United States Patent
Thomas et al.

(10) Patent No.: US 12,438,823 B2
(45) Date of Patent: Oct. 7, 2025

(54) INTELLIGENT DATA INGESTION CHUNK SIZE OPTIMIZATION

(71) Applicant: International Business Machines Corporation, Armonk, NY (US)

(72) Inventors: Binoy Thomas, Kozhikode (IN); Sudheesh S. Kairali, Kozhikode (IN); Hans W Uhlig, San Jose, CA (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 18/503,632

(22) Filed: Nov. 7, 2023

(65) Prior Publication Data
US 2025/0150404 A1    May 8, 2025

(51) Int. Cl.
H04L 47/36    (2022.01)
H04L 43/16    (2022.01)

(52) U.S. Cl.
CPC ............ *H04L 47/365* (2013.01); *H04L 43/16* (2013.01)

(58) Field of Classification Search
CPC .............................. H04L 47/365; H04L 43/16
See application file for complete search history.

(56) References Cited

U.S. PATENT DOCUMENTS

| | | | | |
|---|---|---|---|---|
| 5,481,562 | A * | 1/1996 | Pearson | H04L 1/0008 375/377 |
| 11,451,485 | B2 * | 9/2022 | Sivaraj | H04L 67/12 |
| 11,481,679 | B2 * | 10/2022 | Venkataraman Ganesh | G06F 8/60 |
| 11,678,201 | B2 * | 6/2023 | Veggalam | H04W 24/02 370/252 |

(Continued)

FOREIGN PATENT DOCUMENTS

KR    20140102292 A    8/2014

OTHER PUBLICATIONS

Zhang et al., Adaptive Block and Batch Sizing for Batched Stream Processing System, 2016 IEEE International Conference on Autonomic Computing (ICAC), Jul. 17-22, 2016.

(Continued)

*Primary Examiner* — David R Lazaro
(74) *Attorney, Agent, or Firm* — Garg Law Firm, PLLC; Rakesh Garg; Jared Chaney

(57) ABSTRACT

An embodiment establishes a transmission performance database that comprises performance data related to transmission of data across a plurality of data channels of a network. The embodiment defines an initial data chunk size for a first data object transmitted across a first data channel of the plurality data channels of the network. The embodiment transmits the first data object across the first data channel according to the initial data chunk size. The embodiment collects performance data for the first data channel. The embodiment evaluates transmission performance of the (Continued)

first data channel based at least in part on the performance data of the first data channel. The embodiment generates a recommendation to adjust the initial data chunk size of the first data object based on the transmission performance of the first data channel. The embodiment adjusts the initial data chunk size based at least in part on the recommendation.

20 Claims, 7 Drawing Sheets

(56) References Cited

U.S. PATENT DOCUMENTS

| | | | | |
|---|---|---|---|---|
| 2002/0089935 | A1* | 7/2002 | Chan | H04L 1/0007 370/252 |
| 2016/0005016 | A1* | 1/2016 | Eliahu | G06Q 20/1235 705/44 |
| 2016/0037364 | A1* | 2/2016 | Kairouz | H04L 1/0015 370/252 |
| 2017/0206906 | A1* | 7/2017 | Jung | G10L 19/005 |
| 2020/0007427 | A1* | 1/2020 | Kumar T V | H04L 67/142 |
| 2020/0028931 | A1 | 1/2020 | Zhu et al. | |
| 2020/0050586 | A1 | 2/2020 | Pal et al. | |
| 2020/0177516 | A1* | 6/2020 | Thorstensen | H04L 47/365 |
| 2021/0250254 | A1* | 8/2021 | Bentley | H04L 41/5054 |
| 2021/0311957 | A1 | 10/2021 | Georgievski et al. | |
| 2022/0179846 | A1 | 6/2022 | Huang et al. | |
| 2022/0272142 | A1* | 8/2022 | Li | H04L 12/1831 |
| 2025/0150404 | A1* | 5/2025 | Thomas | H04L 43/16 |

OTHER PUBLICATIONS

Jayakumar, Data Ingestion Optimization in Apache Druid, Jun. 23, 2022, https://www.linkedin.com/pulse/data-ingestion-optimization-apache-druid-jayakumar-radhakrishnan/.

Microsoft, IngestionBatching policy, May 24, 2023, https://docs.microsoft.com/en-us/azure/data-explorer/kusto/management/batchingpolicy.

* cited by examiner

INTELLIGENT DATA INGESTION CHUNK SIZE OPTIMIZATION

BACKGROUND

The present invention relates generally to data processing. More particularly, the present invention relates to a method, system, and computer program for intelligent chunk size optimization in data ingestion.

Computer systems and computer networks utilize various means to store, transmit, and process data. In particular, a computer network often includes a complex infrastructure that facilitates the transmission of data between different locations for different purposes. The process of transmitting data between different locations across a computer network involves a combination of hardware, software, and specific protocols that enable efficient and reliable data communication.

In a computer network environment, various devices and components of the network generate data at various respective source locations. The data that is generated may include various forms, including but not limited to, text data, image data, video data, etc., which is then transmitted to a user or other application upon request. Before data is transmitted, the data is typically divided into smaller units, known as data packets. Accordingly, each data packet contains a portion of the data, as well as additional information such as a source address, a destination address, sequence numbers, as well as error-checking codes. The source location of the data may include a computer, server, smartphone, or any network device, that initiates transmission of data packets across the network. The destination location for the data packets also may include any networked device, which extracts the data from the data packets to reassemble the data back into the original form. Further, the destination location device will typically perform error checking and initiate retransmission of data packets if data packets are lost or corrupt during transmission.

There are various performance metrics that are typically used to evaluate the performance of data transmission over a network. Some examples of performance metrics that may be used to evaluate performance of data transmission over a network may include, but are not limited to, throughput, bandwidth utilization, latency, connection establishment time, jitter, packet loss rate, packet delivery ratio, packet reordering, error rate, transfer time, congestion, and hardware utilization, such as computer memory utilization. One consideration that may affect the performance of data transmission over a network may include the actual size of the data packets. (also known as "chunk size") corresponding to data being transmitted over a network.

SUMMARY

The illustrative embodiments provide for intelligent data chunk size optimization. An embodiment includes establishing a transmission performance database, wherein the transmission performance database comprises performance data related to transmission of data across a plurality of data channels of a network. The embodiment also includes defining an initial data chunk size for a first data object transmitted across a first data channel of the plurality data channels of the network. The embodiment also includes transmitting the first data object across the first data channel according to the initial data chunk size. The embodiment also includes collecting performance data for the first data channel data and storing the performance data for the first data channel on the performance database. The embodiment also includes evaluating transmission performance of the first data channel based at least in part on the performance data of the first data channel. The embodiment also includes generating a recommendation to adjust the initial data chunk size of the first data object based on the transmission performance of the first data channel. The embodiment also includes adjusting the initial data chunk size based at least in part on the recommendation.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
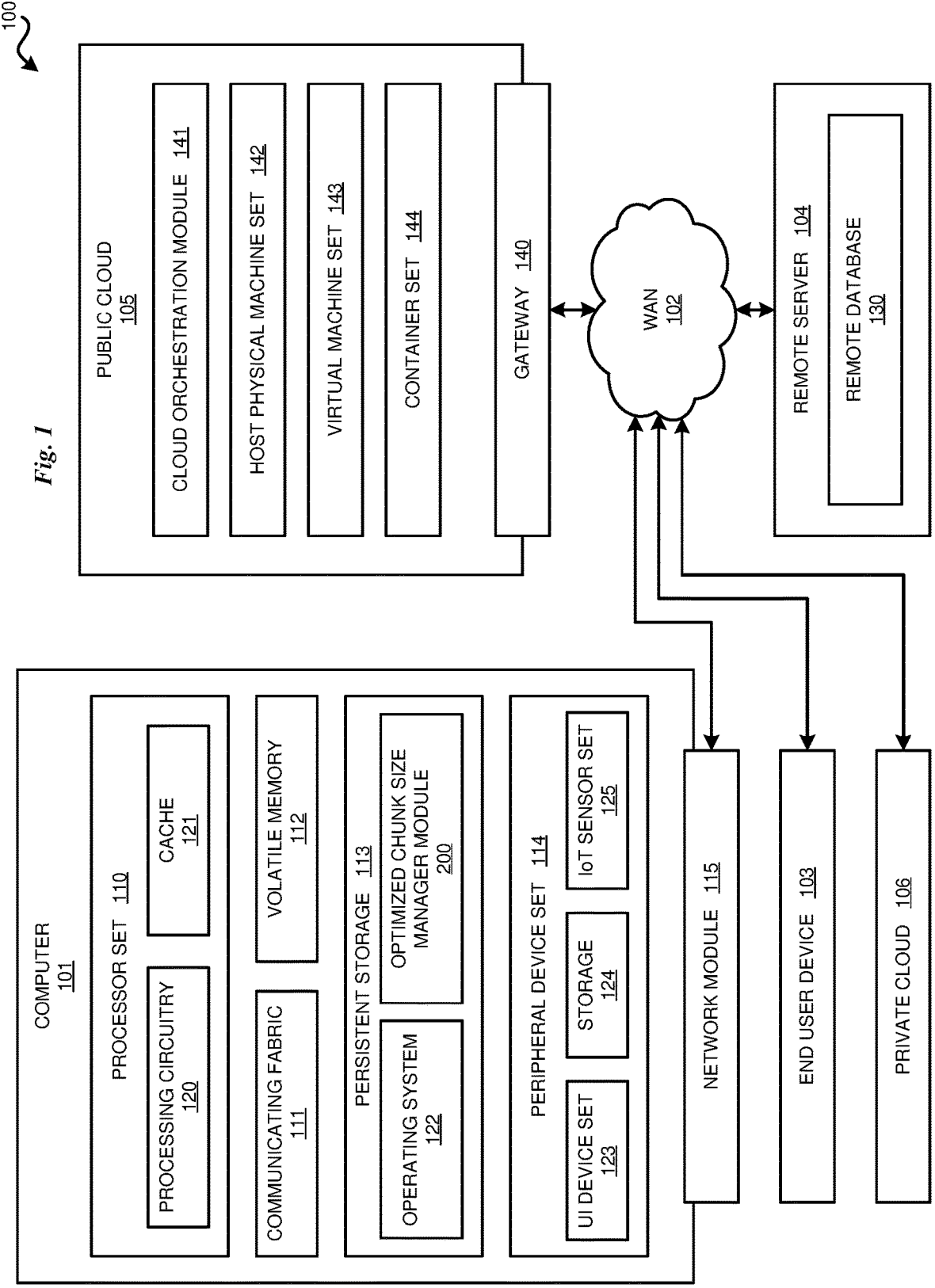
FIG. 1 depicts a block diagram of a computing environment in accordance with an illustrative embodiment.

The technological field of data storage is directed towards the development of data storage devices such as magnetic, optical, or mechanical media that record and preserve digital information for ongoing or future operations. Accordingly, data storage includes storing digital information in a structured and organized manner for access and retrieval. Transmission of data across a network and ingestion of data from a source to a data storage medium may be improved by providing an optimal data chunk size. The optimal data chunk size may vary depending on a number of factors, including but not limited to, the number of documents stored, size of data, network overheard parameters associated with each data connection, and/or database processing requirements for each chunk of data (e.g., indexing overhead).

Data chunk size used in data transfer may significantly impact performance metrics associated with data transmission. For example, larger data chunks may result in higher throughput since larger chunks may reduce the overhead associated with initiating and completing individual transfers. In contrast, smaller chunks may result in lower throughout due to increased overhead resulting from an increased amount of initiating and completing of individual transfers. Further, data chunk size may affect how efficiently available network bandwidth is utilized, such that larger chunks may provide more efficient bandwidth utilization compared to smaller chunks. In terms of latency, smaller chunks may reduce latency compared to larger chunks since smaller chunks are typically processed more quickly than larger chunks, whereas larger chunks may increase latency due to longer processing times and queuing delays. Further, smaller chunks may reduce jitter by providing more consistent and predictable data transfer intervals, whereas larger chunks may result in more significant variations in data packet arrival times, thereby increasing jitter.

Further, since smaller data chunks may result in more frequent acknowledgments, thereby reducing risk of packet loss, smaller chunks may provide a smaller packet loss rate compared to larger chunks, since larger data chunks involve longer intervals between acknowledgement, thereby increasing the chance of packet loss. Similarly, smaller data chunks may provide a higher packet delivery ratio than larger data chunks due to the increased amount of acknowledgement compared to larger chunks. Also, smaller data chunks may provide a lower error rate since errors may be detected more quickly, and thus corrected more quickly, compared to larger data chunks which may exhibit a higher error rate due to more extensive amounts of data of a larger chunk in transit when an error occurs.

Further, in terms of overall transfer time, smaller data chunks may reduce transfer time for small to medium-sized transfers due to faster processing and transmission. However, depending on the size of the data, and especially for very large transfers, larger data chunks may be more efficient due to a reduction of overhead costs resultant from processing more smaller chunks compared to fewer larger chunks. Further, in terms of network congestion, smaller chunks may increase congestion due to a greater number of associated acknowledgments and control packets compared to larger chunks, and thus larger chunks may be more efficient in reducing network congestion due to fewer overhead packets as compared to smaller chunks.

Accordingly, selecting the optimal chunk size involves the consideration of trade-offs, including the trade-offs described above. Further, the selection of optimal chunk size as well as the impact of chunk size on performance metrics may also be determined at least in part on specific network infrastructure, data transfer protocols, as well as use cases. In consideration of the trade-offs discussed above, there is a need for a system and process to manage data transmission between locations across a network that provides an optimal chunk size to increase performance of data transmission across the network.

Further, there is a need for managing data transmission and automatically determining chunk size for each data channel of a multitude of data channels across a network, since aspects of transfer of data may be specific to each data channel. Also, depending on the complexity of a network, it may not be feasible to determine chunk size manually for each data channel. For example, in the Data Fabric Architecture, the combination of source and destination in multiple levels and types of processes on data increases exponentially. Thus, it may be difficult to design optimal chunk size in terms of size or numbers during the development phase of applications, or even when given configurable parameters to operations, since chunk sized tweaking parameters differs in each connection or process, and each tweaking currently requires multiple trial-and-error based iterations. Further, since the Data Fabric Architecture includes different mechanisms for processing, storing, and loading data, each of these different mechanisms may require different sizes of units to achieve optimal performance.

Despite improvements in data transmission and data storage techniques, there is currently no way to optimally adjust chunk data size for data transmission, storage and/or data retrieval-based processes. The present disclosure addresses the deficiencies described above by providing a process (as well as a system, method, machine-readable medium, etc.) that develops an Optimal Chunk Size Manager ("OCSM") that optimizes data chunk size for data ingestion. The process considers automatically adjusting data chunk size for data transmitted across a data channel to maximize network performance and minimize data degradation. Disclosed embodiments include incrementally increasing data chunk size to reduce overall network overhead costs while simultaneously monitoring network performance metrics to prevent degradation and ensure efficient data transfer for a plurality of data channels of a network.

The illustrative embodiments provide for intelligent chunk size optimization in data ingestion. A data chunk (or simply a "chunk") as referred to herein is an amount of data, or a size of a data packet, corresponding to a portion of a whole piece of data. Some embodiments disclosed herein describe the network architecture as Data Fabric Architecture; however, use of this example is not intended to be limiting, but is instead used for descriptive purposes only. Instead, the network can include elements of any type of network architecture, such that the network may include any number of network devices, processing entities, data store locations, and connections between such.

As used throughout the present disclosure, the term "performance metric" refers to any metric associated with the performance of a network, and more specifically, any metric associated with the ability to transmit data between data store locations in a network. Examples of performance metrics may include, but are not limited to, throughput, bandwidth utilization, latency, connection establishment time, jitter, packet loss rate, packet delivery ratio, packet reordering, error rate, transfer time, congestion, and hardware utilization, such as computer memory utilization.

As used throughout the present disclosure, the term "data transfer degradation" refers to a decrease in efficiency of data transfer over a network. Accordingly, data transfer degradation may be indicated by the increase in an undesirable performance metric, such as for example, increased bandwidth utilization, increased latency, increased transfer time, increased error rate, etc. Further, data transfer degradation may also be indicated by the decrease of a desirable performance metric, such as for example, decreased throughput, decreased packet delivery ratio, etc.

Illustrative embodiments include an Optimized Chunk Size Manager ("OCSM") configured to monitor network performance with respect to data transfer across a plurality of data channels of a network, and configured to adjusting chunk size for data transferred over one or more data channels of the plurality of data channels of the network. In an embodiment, the OCSM registers the address of each data source location and each target data store location and registers each pair of source location and target location as a data channel. Illustrative embodiments further include establishing a transmission performance database that stores chunk size data and historical performance data related to transmission of data across one or more of the plurality of data channels of a network. Illustrative embodiments further include correlating chunk size data to historical performance data to determine an optimal data chunk size for one or more data channels of the network.

Illustrative embodiments further include defining an initial data chunk size for a first data object transmitted across a first data channel of the plurality data channels of the network, transmitting the first data object across the first data channel according to the initial data chunk size, collecting performance data for the first data channel data and storing the performance data for the first data channel on the performance database. Illustrative embodiments further include evaluating transmission performance of the first data channel based at least in part on the performance data of the first data channel. Accordingly, evaluating the effectiveness of the set chunk size for each particular data channel enables a determine whether increasing chunk size improves data transmission performance. Illustrative embodiments further include generating a recommendation to adjust the initial data chunk size of the first data object based on the transmission performance of the first data channel, and upon acceptance of the recommendation, adjusting the initial data chunk size based at least in part on the recommendation.

In an embodiment, adjusting the initial chunk size includes incrementing the data chunk size. In an embodiment, the amount by which the data chunk size is incremented is predetermined. In an embodiment, the amount by which the data chunk size is incremented is based at least in part on historical performance data correlated with chunk size for a similar channel. In an embodiment, the chunk size is iteratively incremented until data transfer degradation is observed. In an embodiment, for each data channel, a data chunk size is selected for feeding into a processing entity and is incrementally increased for feeding into the processing entity upon acknowledgement of the completion of a process by the processing entity. In an embodiment, the optimal chunk size manager listens to the time taken to complete the processing, as well as the number of failures that occur during the processing. In an embodiment, if the failure rate does not exceed a predetermined failure rate threshold, the chunk size may be incrementally increased for further processing operations. In an embodiment, if the failure rate exceeds a predetermined failure rate threshold, then the data processing may be repeated with a previous smaller chunk size.

Illustrative embodiments further include dynamically adjusting data chunk size for each data channel of a plurality of data channels based at least in part on data consumption history. For example, it may be the case that data consumption across one or more channels is higher during some periods and lower during other periods. In such a scenario, an embodiment adjusts the chunk size based on historical data consumption trends enable the most efficient utilization of network bandwidth, memory, and prevent congestion. Illustrative embodiments further include establishing a schedule for data chunk size adjustment for one or more data channels of the network.

Illustrative embodiments further include training a machine learning model to reliably predict optimal data chunk size. In an embodiment, the machine learning model may be trained at least in part on historical performance data for each data channel, historical data chunk size utilized for each data channel, historical overall network performance data, as well as data related to acceptance of generated recommendations to adjust data chunk size.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as providing an optimized chunk size management module 200 that monitors performance of data transfer across data channels of a network, and provides recommendations to adjust the data chunk size for data transmitted across one or more of the data channels. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
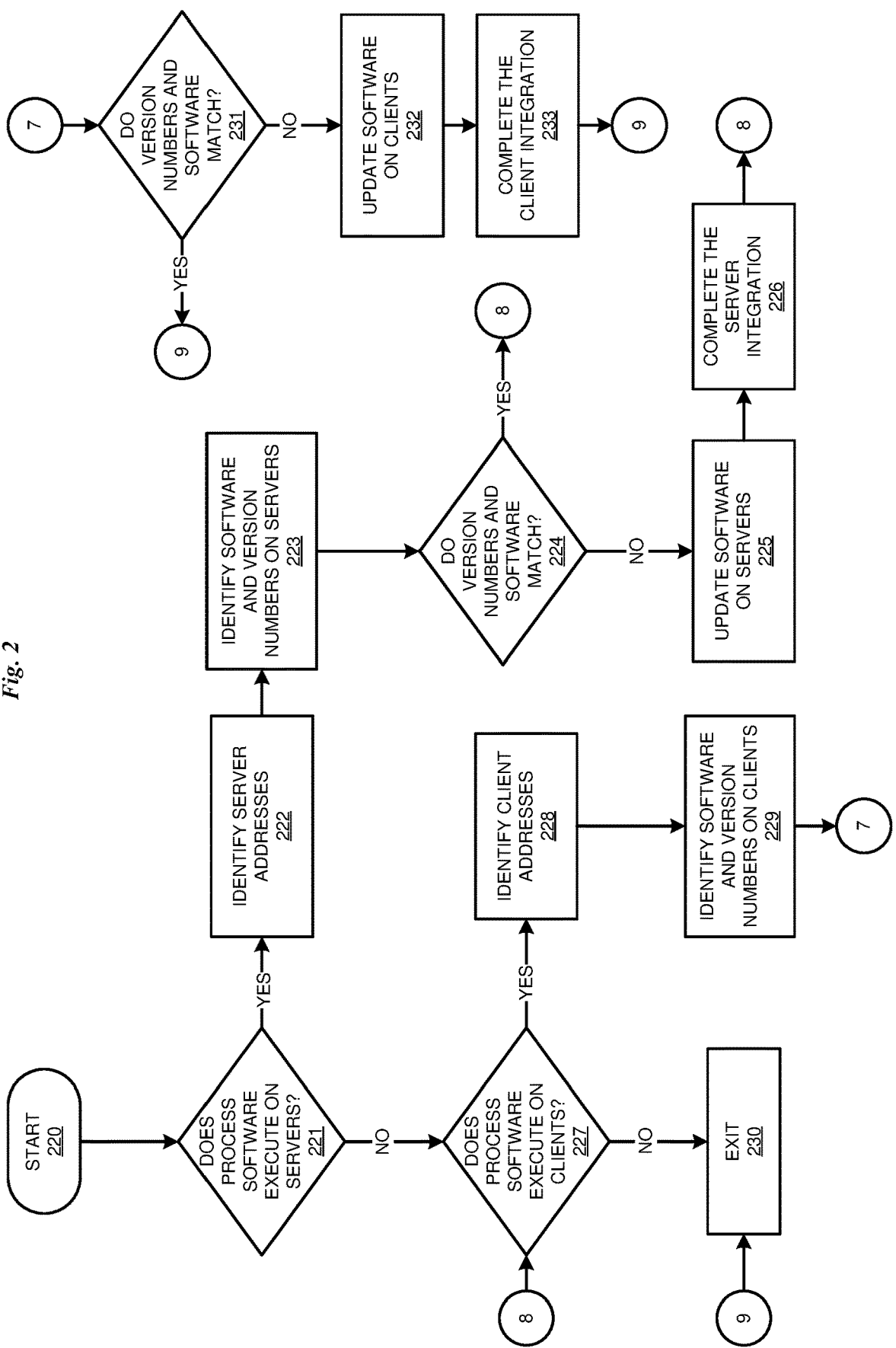
FIG. 2 depicts a block diagram of an example service infrastructure in accordance with an illustrative embodiment.

With reference to FIG. 2, this figure depicts a method for software integration. In an embodiment, the process software including the Optimized Chunk Size Manager ("OCSM") software is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
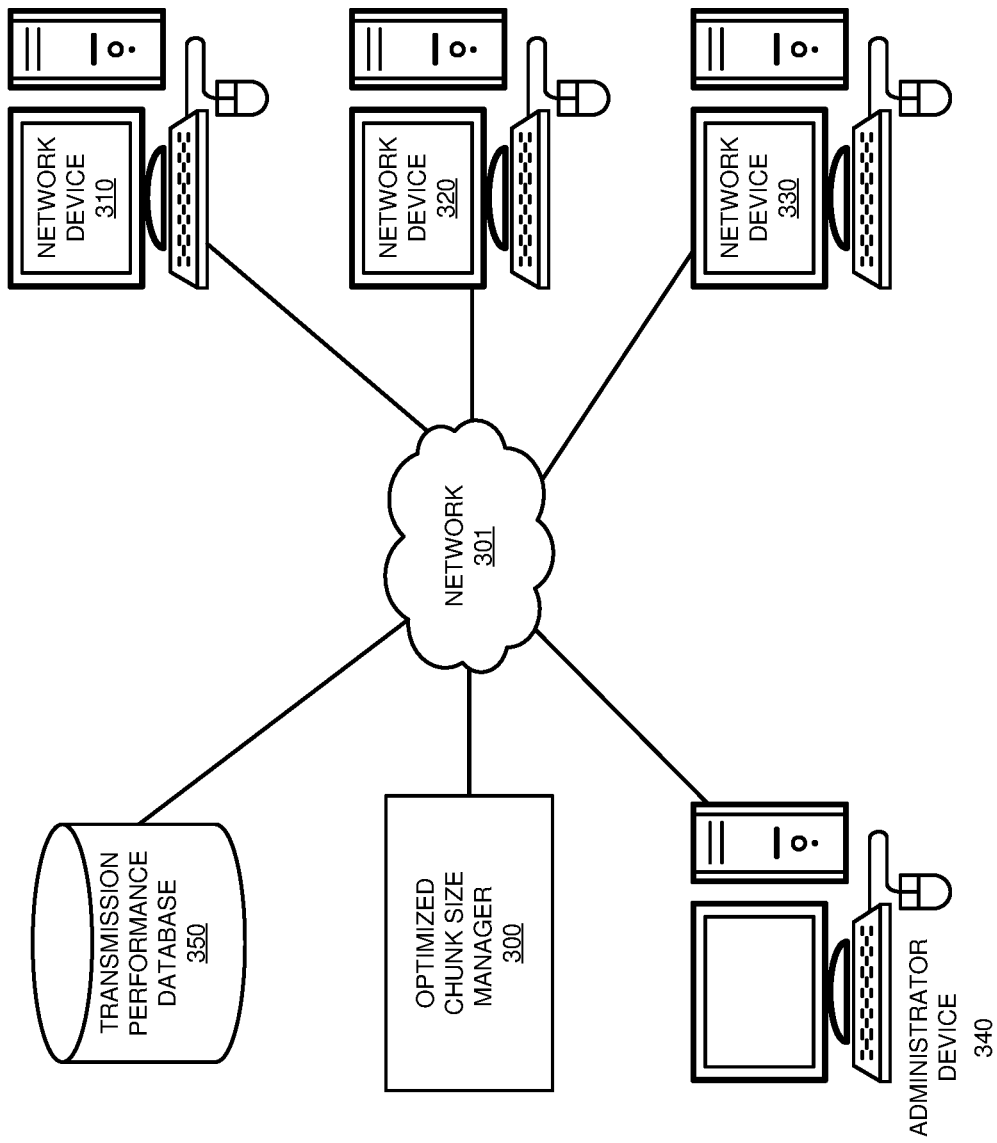
FIG. 3 depicts a block diagram of an example computing environment in accordance with an illustrative embodiment.

With reference to FIG. 3, this figure depicts a block diagram of an example computing environment in accordance with an illustrative embodiment. In the illustrated embodiment, the Optimal Chunk Size Manager ("OCSM") module 300 includes Optimal Chunk Size Manager ("OCSM") module 200 of FIG. 1.

In the illustrative embodiment, the OCSM module 300 is in communication with a plurality of network devices, including a first network device 310, a second network device 320, and a third network device 330 via network 301. Each network device of the plurality of network devices communicates data across network 301 in connection with a variety of software applications that may run on each of the network devices. Accordingly, each network device shown may represent a different processing entity. In an embodiment, network 301 includes any suitable network or combination of networks such as the Internet, etc., and may use any suitable communication protocols such as Wi-Fi, Bluetooth, etc., to enable OCSM module 300 to monitor, collect, and/or adjust transmission of data across network 301. In some embodiments, OCSM module 300 is stored on a remote storage device (not shown). In some other embodiments, OCSM module 300 is stored on a non-transitory computer readable medium of administrator device 340. In an embodiment, network 301 includes a Data Fabric Architecture, and OCSM module 300 is integrated into the Data Fabric Architecture. First network device 310, second network device 320, third network device 330, and administrator device 340 may include any suitable computing device, including but not limited to, a server, a desktop computer, a laptop, a tablet, a smartphone, an embedded system, etc.

In the illustrative embodiment, OCSM module 300 is a software module configured to analyze data transmission and evaluate data transmission performance across one or more data channels to determine an optimized data chunk size for transmitting data across each of the one or more data channels. In an embodiment, the OCSM module 300 incrementally increases data chunk size until data transmission performance degrades. In an embodiment, OCSM 300 module enables a person having sufficient privileges to define an initial chunk size, increment size, chunk size restricted data transmission schedule, and other features associated with OCSM module 300.

In the illustrative embodiment, transmission performance database 350 stores data related to data transmission performance related to data channels across network 301. Examples of data transmission performance data may include, but are not limited to, chunk size, throughput, transmission speed, failure rate, etc. In an embodiment, OCSM 300 generates recommendations to adjust data chunk size for one or more data channels based on historical performance data stored on transmission performance database 350. In the illustrative embodiment, administrator device 340 enables a person having suitable privileges to modify one or more parameters and/or features associated with OCSM module 300.

Figure 4:
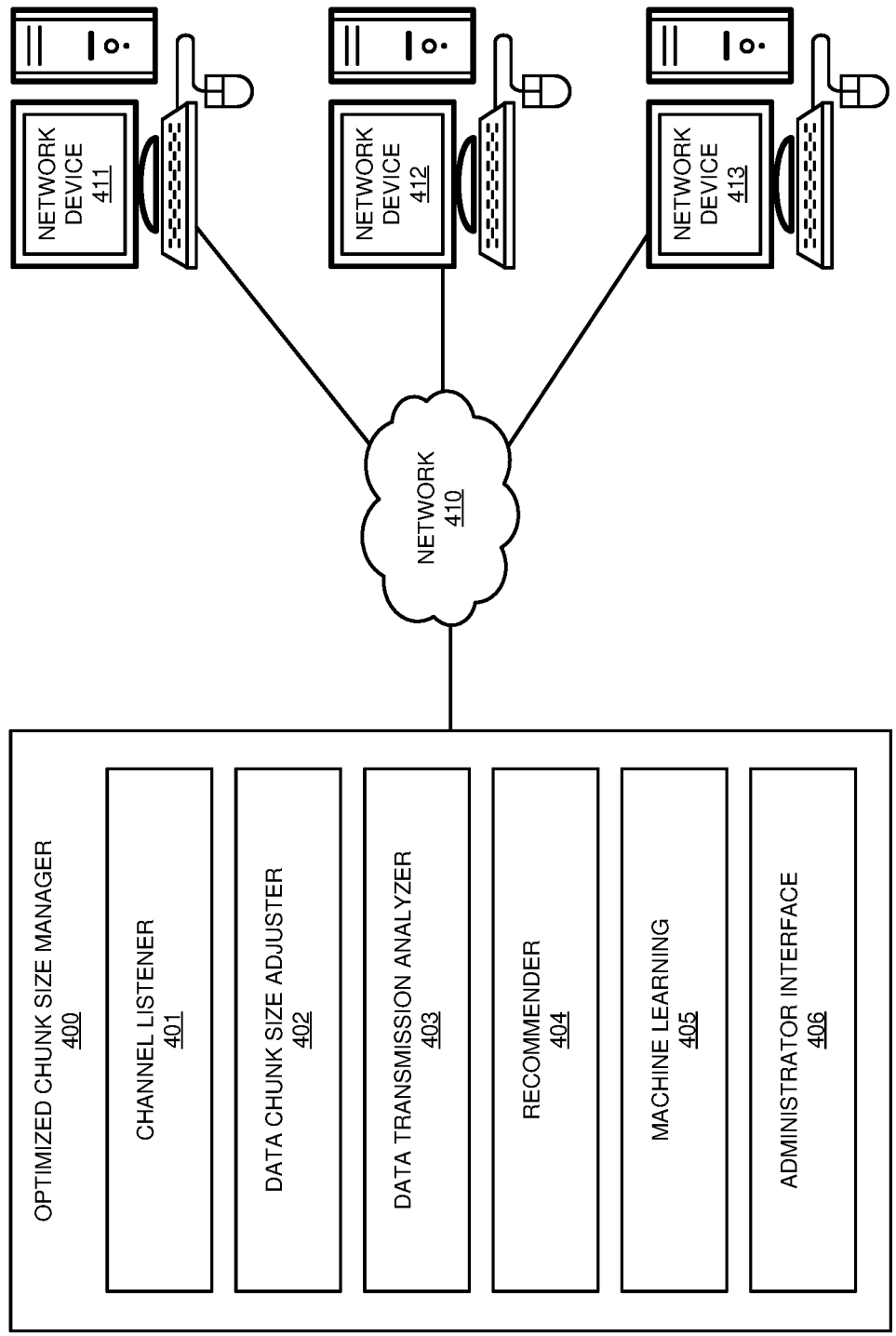
FIG. 4 depicts a block diagram of an example optimal chunk size manager module in accordance with an illustrative embodiment.

With reference to FIG. 4, this figure depicts a block diagram of an example Optimal Chunk Size Manager in accordance with an illustrative embodiment. In an embodiment, Optimal Chunk Size Manager ("OCSM") module 400 includes OCSM module 200 of FIG. 2, and/or OCSM module 200 of FIG. 1. In an embodiment, network 410 includes network 301 of FIG. 3. In a particular embodiment, network 410 includes a Data Fabric Architecture, and OCSM module 400 is integrated as a plugin into the Data Fabric Architecture. In an embodiment, network device 411, network device 412, and network device 413 each represent a processing entity that may transmit, store, and/or process data transmitted over network 410, and each may represent a data source location and/or a target data store location.

In the illustrative embodiment, OCSM module 400 is a software module that includes other software modules in communication with each other. In the illustrative embodiment, OCSM module 400 includes a channel listener module 401, a data chunk size adjuster module 402, a data transmission analyzer module 403, a recommender module 404, a machine learning module 405, and an administrator interface module 406. In alternative embodiments, the OCSM module 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrative embodiment, the channel listener module 401 is a software module configured to collect transmission performance data related to data transmission over at least one data channel between a particular data source location and a particular target data store location. In an embodiment, the channel listener module 401 collects performance data that may include, but is not limited to, data transmission rate (e.g., bytes/second), data transmission failure rate, data transmission overhead costs, hardware utilization (e.g., memory utilization, CPU utilization, GPU utilization, network bandwidth utilization, etc.), as well as any other characteristics related to data transmission performance. Accordingly, such performance metrics are characteristics related to data transmission that may be indicative of overall data transmission performance over a network.

In the illustrative embodiment, data chunk size adjuster module 402 is a software module configured to adjust the size of data chunks of a data object being transmitted over a data channel. The data chunk size adjuster module 402 may adjust data chunk size according to any increment. For example, a 10 gigabyte data object may be transmitted in 1 gigabyte data chunks, 100 megabyte data chunks, 1 megabyte data chunks, 100 kilobyte data chunks, 1 kilobyte data chunks, etc. In an embodiment, the data chunk sizer adjuster module 402 adjusts the data chunk size in response to receiving a command to adjust the data chunk size issued by an administrator (or any other person having sufficient privileges) via the administrator interface module 406, as described in greater detail herein. In some other embodiments, data chunk size adjuster module 402 automatically adjusts data chunk size based on historical performance data and/or a predetermined schedule.

In the illustrative embodiment, data transmission analyzer module 403 is a software module configured to analyze and evaluate the performance of data transmission from a data source to a target data store across a data transmission channel. In an embodiment, the data transmission analyzer module 403 utilizes the performance related to data transmission obtained by channel listener module 401, as well as the data chunk size, as input parameters to determine the performance of the data transmission across a particular data channel. In an embodiment, data transmission analyzer module 403 detects degradation of transmission performance. For example, it may be the case that incrementing data chunk size for a particular data channel ceases to provide improvements to transmission performance, and instead results in a degradation of transmission performance, wherein such degradation may be observed by detecting a decrease in throughput, and increase in error rate, etc.

In the illustrative embodiment, the recommender module 404 is a software module configured to generate a recommendation to adjust the data chunk size. In an embodiment, the recommender generates a recommendation to adjust the data chunk size based at least in part on the performance of the data transmission across a given data channel. In an embodiment, if no degradation is detected, the recommender module 404 may recommend to incrementally increase the data chunk size for further processing operations. In an embodiment, if degradation is detected, the recommender module 404 may recommend to decrease the data chunk size for further processing, for example, with the previous smaller chunk size.

In the illustrative embodiment, the machine learning module 405 is a software module configured to generate a machine learning model to provide optimal chunk size adjustment recommendations. In an embodiment, the machine learning module 405 includes a model trainer, a data preparation module, an algorithm module, a training engine, and a machine learning model. In some embodiments, the model trainer generates a machine learning model based on an algorithm provided by algorithm module. In an embodiment, the algorithm module selects the algorithm based on one or more known machine learning algorithms. In an embodiment, model trainer includes a training engine that trains the machine learning model using a training dataset. In some embodiments, the training dataset is preprocessed by a data preparation module for the model trainer. In an embodiment, the training engine trains the machine learning model using the training dataset, resulting in the trained machine learning model. In some embodiments, the training dataset is divided into two discrete subsets, where one subset is used by the training engine for initially training the machine learning model, and the other subset is used by the training engine to test the trained model and determine the accuracy of the trained model. In an embodiment, the machine learning model may be trained at least in part on historical performance data for each data channel, historical data chunk size utilized for each data channel, historical overall network performance data, as well as data related to acceptance of generated recommendations to adjust data chunk size.

In the illustrative embodiment, the administrator interface 406 is a software module configured to allows a user with sufficient administrative privileges to perform various administrative tasks associated with the optimized chunk size manager module 400 as described herein, such as defining an initial data chunk size, defining an increment size, defining a chunk size restricted data transmission schedule, initiating a correlation process, initiating a neural network training process, etc.

Figure 5:
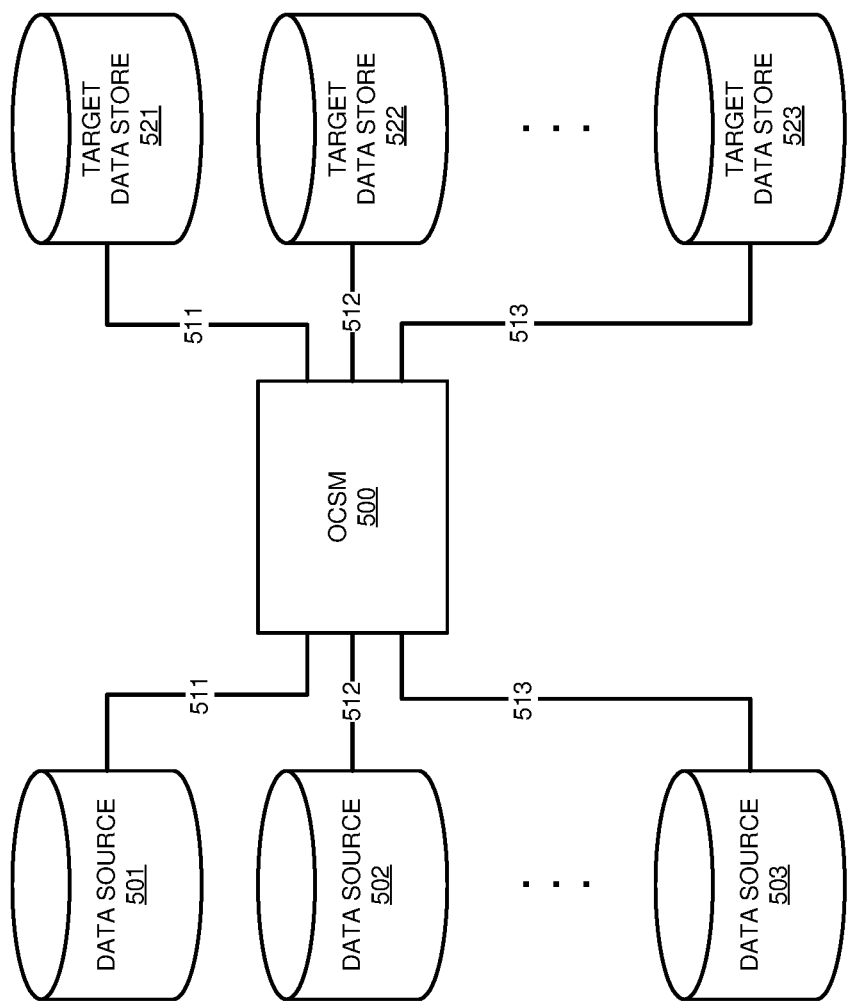
FIG. 5 depicts a block diagram of an example process for chunk size optimization in accordance with an illustrative embodiment

With reference to FIG. 5, this figure depicts a block diagram of an example process for chunk size optimization in accordance with an illustrative embodiment. In the illustrative embodiment, OCSM module 500 includes OCSM module 400 of FIG. 4, OCSM module 200 of FIG. 2, and/or OCSM module 200 of FIG. 1.

In the illustrative embodiment, a plurality of data sources, including a first data source 501, a second data source, and an nth data source 503 are shown. Although FIG. 5 depicts three data sources, it is contemplated that any number of data sources may be included. Further, each of the first data source 501, the second data source 502, and the nth data source 503 are shown transmitting data to each of a first target data store 521, a second target data store 522, and an nth target data store 523, respectively, via a first data channel 511, a second data channel 512, and an nth data channel 513, respectively.

In the illustrative embodiment, OCSM 500 listens to the data transmission taking place over each of the first data channel 511, the second data channel 512, and the nth data channel 513 to obtain performance metrics related to data transmission between each data source and each target data store. Based on the data transmission performance across each data channel, the OCSM 500 adjusts the data chunk size for data chunks transmitted across each data channel. In an embodiment, the OCSM 500 incrementally increases data chunk size based on the data transmission performance of a channel given a data chunk size.

In an embodiment, each data source and each data target location are registered in the OCSM 500 as a pair, forming a unique data channel. Accordingly, the first data source 501 and the first target data store 521 forms the first data channel 511, in which the first data source 501 sends data to the first target data store 521 and the first target data store 521 receives and ingests incoming data from the first data source 501. Likewise, the second data source 502 and the second target data store 522 forms the second data channel 512, in which the second data source 502 sends data to the second target data store 522 and the second target data store 522 receives and ingests incoming data from the second data source 502. Likewise, the nth data source 503 and the nth target data store 523 forms the nth data channel 513, over which the nth data source 503 sends data to the nth target data store 523 and the nth target data store 523 receives and ingests incoming data from the nth data source 503. Although not depicted, it is contemplated herein that multiple data sources may transmit data to multiple target data stores, such that a single data source may send data to multiple processing entities, and a single processing entity may receive data from multiple data sources. Accordingly, each connection is registered as a data channel in the channel registry of the OCSM 500.

Further, each target data source may correspond to a processing entity responsible for a particular application, such as for example, a consolidation solution, machine learning pre-processing or processing application, an indexing process, etc. For each data channel, the OCSM 500 selects a chunk size, and may incrementally increase the data chunk size for feeding into the processing entity, and each processing entity acknowledges the completion of a process a given chunk size. Further, the OCSM 500 listens to the time taken to complete the processing, as well as the number of failures that occur during the processing. If the failure rate does not exceed a predetermined failure rate threshold, the chunk size may be incrementally increased for further processing operations. If the failure rate exceeds a predetermined failure rate threshold, then the data processing may be repeated with a previous smaller chunk size. The OCSM 500 evaluates the effectiveness of the set chunk size for each particular data channel, to determine whether increasing chunk size improves data transmission performance. If the OCSM 500 determines that increasing chunk size results in degradation to transmission performance, by for example, detecting slower response time and/or increased failure rate, the OCSM 500 may adjust the chunk size to arrive at an optimal chunk size via coefficient correlation and/or machine learning based on historical performance.

In an embodiment, OCSM 500 dynamically adjusts the chunk size for each data channel. For example, it may be the case that some channels are active on only certain days of the week, or perhaps only once a week or once a month.

Since the OCSM 500 maintains a holistic view of data channels and historical transmission data of each data channel, the OCSM 500 is able to identify periods of high and low data transmission and consumption across each data channel. Accordingly, the OCSM 500 may optimize data movement based on historical periods of data consumption across each channel.

In an embodiment, the OCSM 500 stores overall data movement history and processing efficiency of all channels registered, and may analyze all channels and optimal chunk size derived for each channel, as well as provide recommendations of resource allocation. For example, suppose that the OCSM identifies peak data transfer occurring over a channel from Sunday to Saturday. In such a scenario, supposing also that the weekdays may be busy, the OCSM 500 may generate a recommendation to suggest the network resource allocation and use optimal chuck size without processing the channel by using historical values. Accordingly, the OCSM 500 may extrapolate a week's historical chunk size and resource recommendations to a month's period (or a larger period).

In an embodiment, the OCSM 500 is integrated into a network infrastructure including an ecosystem of data processing components. In a particular embodiment, OCSM 500 is integrated into a Data Fabric Architecture. Accordingly, each Each source and destination in the Data Fabric Architecture may be registered to OCSM 500 as a channel. For example, a data ingestion from a customer RDBMS to Elasticsearch in cloud may form a channel. Another channel may be formed from a specific field of Elasticsearch index that will need to be vectorized using TensorFlow. In such a scenario, each channel will have entirely different characteristics. For example, one channel represents data copy from RDBMS to Elasticsearch, here the source query size, network latency (as the customer data does not reside the Data Fabrics cloud) and Elasticsearch indexing performance where size of data plays a major role. The second channel will have relevance with different properties. Network latency may not have much relevance as data movement may happen in Cloud and may have same subnet as well. However, the performance of TensorFlow itself may have more impact. However, although each channel may exhibit have completely difference characteristics and processing requirements, data movement nevertheless still occurs across each channel.

In some embodiments, channels with similar characteristics can be grouped so that their configurable parameters are similar, such as chunk size w.r.t count, size or query time limit etc. One advantage of registering a channel as part of a group includes improving training a machine learning model for providing recommendations for channels part of the same group.

In an embodiment, channel registration via OCSM 500 comprises the source details only to identify and destination details for identification and the parameter to size chunks, and does not include credential or sensitive details. When each data connection happens, the OCSM 500 captures the time for data transfer completion. In an embodiment, the OCSM 500 initializes with the least possible chunk size for each data channel. Then, the OCSM 500 may increase the chunk size incrementally for subsequent connections and collect time taken and response status. Based on response time and status failure rate co-efficiency in the large data set points, the OCSM 500 may arrive at the optimal chunk size. Over the time, the system will have the frequency of usage, data transfer quantity, failure rate, etc., for all channels in the network ecosystem. The OCSM can utilize the above values and using machine learning techniques as discussed herein, can suggest resource allocation, failure prediction, etc. In some embodiments, automatic adjustment of chunk size per channel may be disabled, in which can the OCSM 500 may compare performance of manual selected chunk size against historical performance to provide a recommendation to adjust the chunk size.

Figure 6:
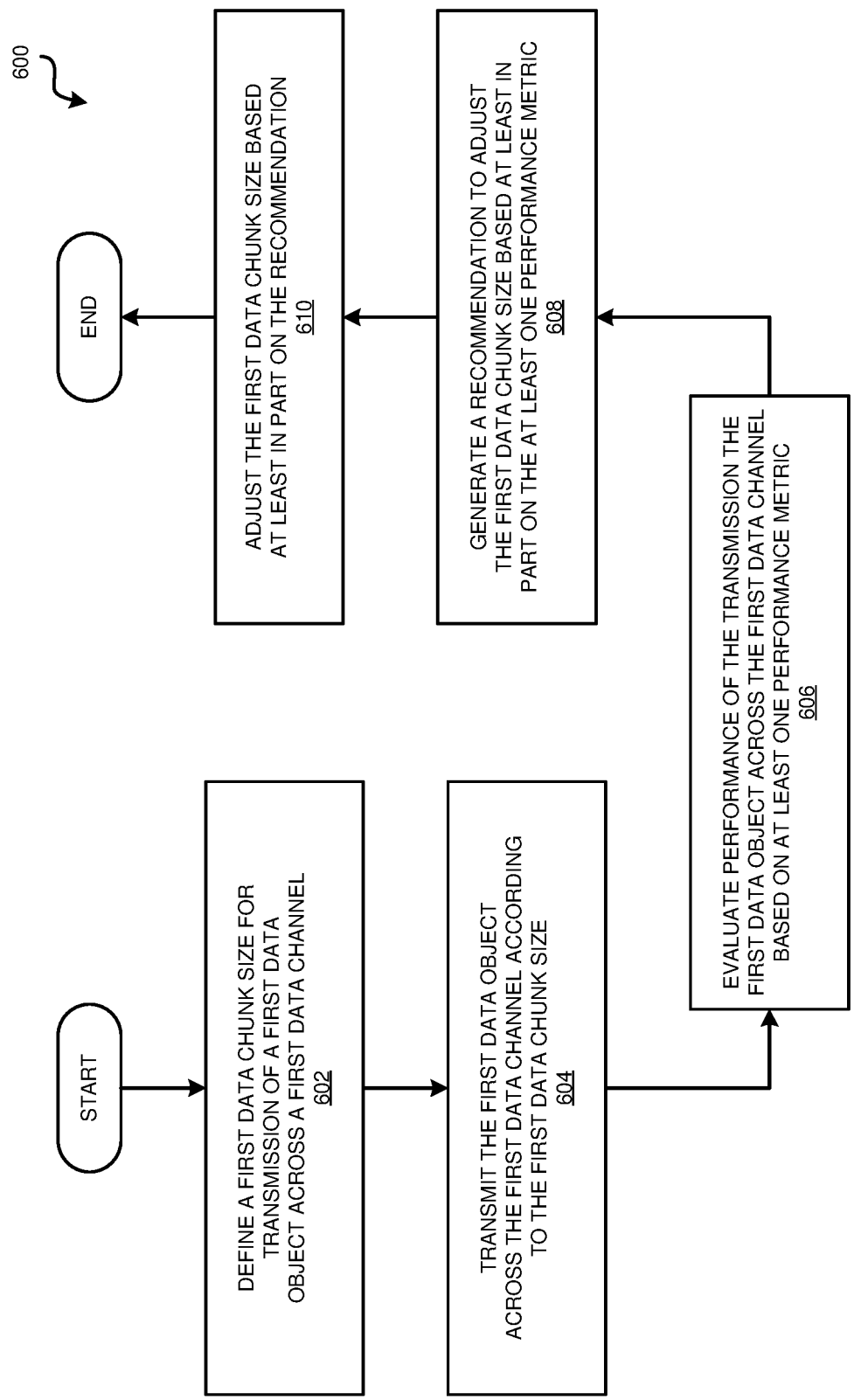
FIG. 6 depicts a flowchart of an example process for chunk size optimization in accordance with an illustrative embodiment.

With reference to FIG. 6, this figure depicts a flowchart of an example process for chunk size optimization in accordance with an illustrative embodiment. In an embodiment, OCSM module 200 of FIG. 1, OCSM module 300 of FIG. 3, OCSM module 400 of FIG. 4, and/or OCSM module 500 of FIG. 5 is configured to perform the steps to execute process 600.

At step 602, the process defines a first data chunk size for transmission of a first data object across a first data channel. In an embodiment, the first data chunk size may be defined via a user interface. At step 604, the process transmits the first data object across the first data channel according to the first data chunk size.

At step 606, the process evaluates the performance of the transmission of the first data object across the first data channel based on at least one performance metric. In an embodiment, the performance metric may include, but is not limited to, throughput, bandwidth utilization, latency, connection establishment time, jitter, packet loss rate, packet delivery ratio, packet reordering, error rate, transfer time, congestion, and hardware utilization, such as computer memory utilization.

At step 608, the process generates a recommendation to adjust the first data chunk size based at least in part on the at least one performance metric. Accordingly, the recommendation may include increasing the data chunk size, or decreasing the data chunk size, depending on the performance (e.g., speed, failure rate, etc.) of data transmission given a current data chunk size that was previously defined. In an embodiment, the recommendation may be sent to a user device via a user interface.

At step 610, the process adjusts the first data chunk size based at least in part on the recommendation. For example, if the recommendation includes a recommendation to increase the data chunk size, the process may increment the data chunk size according to the recommendation. On the contrary, if the recommendation includes a recommendation to decrease the data chunk size, the process may decrease the data chunk size according to the recommendation.

It is contemplated herein that process 600 may include additional aspects that are not specified by FIG. 8. For example, the process may further include determining the optimal chunk size for data transmission across a particular data channel based at least in part on historical performance data. Accordingly, it may be the case that the performance of data transmission at one particular point in time was improved in comparison to performance of data transmission at other points in time. In such a scenario, the process may determine the best performance associated with data transmission given a certain chunk size as the optimal chunk size for a particular period of time. Further, the process may further include constructing a schedule for adjusting data chunk size for one or more data channels based on historical performance data and/or historical data consumption.

Although the process mentions a first chunk size for a first data object across a first data channel, it is contemplated herein that the process may include defining a chunk size for transmission of any number of data object across any number of data channel. It is contemplated that in practice, the process may include defining tens, hundreds, thousands, or even more chunk sizes, depending on the specific data transmission environment and network ecosystem.

Figure 7:
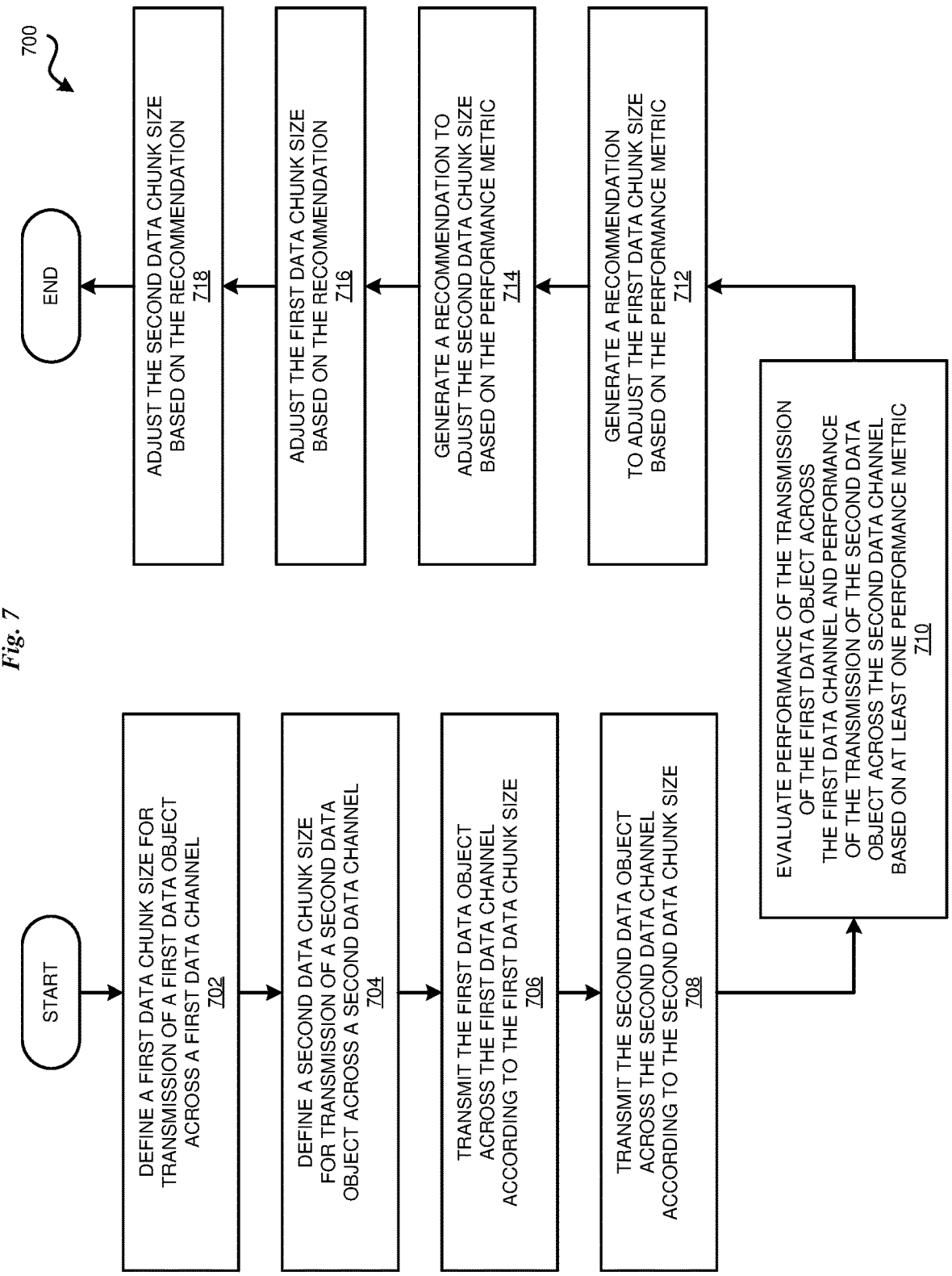
FIG. 7 depicts a flowchart of an example process for chunk size optimization of multiple data channels in accordance with an illustrative embodiment.

With reference to FIG. 7, this figure depicts a flowchart an example process for chunk size optimization for multiple data channels in accordance with an illustrative embodiment. In an embodiment, OCSM module 200 of FIG. 1, OCSM module 300 of FIG. 3, OCSM module 400 of FIG. 4, and/or OCSM module 500 of FIG. 5 is configured to perform the steps to execute process 700. The steps of process 700 are similar to the steps of process 600, except that process 700 includes chunk size optimization for multiple data channels.

At step 702, the process the process defines a first data chunk size for transmission of a first data object across a first data channel. At step 704, the process defines a second data chunk size for transmission of a second data object across a second data channel. It is contemplated that the first data chunk size and the second data chunk size may comprise a different amount. In an embodiment, the first data chunk size and the second data chunk size may be defined via a user interface. At step 706, the process transmits the first data object across the first data channel according to the first data chunk size. At step 708, the process transmits the second data object across the second data channel according to the second data chunk size.

At step 710, the process evaluates the performance of the transmission of the first data object across the first data channel and the performance of the transmission of the second data object across the second data channel based on at least one performance metric, and evaluates based on at least one performance metric. In an embodiment, the process evaluates performance of each data channel using the same performance metric. In another embodiment, the process evaluates the performance of each data channel using a different performance metric. In an embodiment, the performance metric may include, but is not limited to, throughput, bandwidth utilization, latency, connection establishment time, jitter, packet loss rate, packet delivery ratio, packet reordering, error rate, transfer time, congestion, and hardware utilization, such as computer memory utilization.

At step 712, the process generates a recommendation to adjust the first data chunk size based at least in part on the at least one performance metric. At step 714, the process generates a recommendation to adjust the second data chunk size based at least in part on the at least one performance metric. Accordingly, the recommendation may include increasing the data chunk size, or decreasing the data chunk size, depending on the performance (e.g., speed, failure rate, etc.) of data transmission given a current data chunk size that was previously defined. In an embodiment, the recommendation may be sent to a user device via a user interface. It is contemplated that the recommendation may be different for the first data channel compared to the second data channel. For example, it may be the case that the recommendation for the first data channel includes a recommendation to increase data chunk size while the recommendation for the second data channel includes a recommendation to decrease the data chunk size.

At step 716, the process adjusts the first data chunk size based at least in part on the recommendation. At step 718, the process adjusts the second data chunk size based at least in part on the recommendation. For example, if the recommendation includes a recommendation to increase the data chunk size, the process may increment the data chunk size according to the recommendation. On the contrary, if the recommendation includes a recommendation to decrease the data chunk size, the process may decrease the data chunk size according to the recommendation.

The following definitions and abbreviations are to be used for the interpretation of the claims and the specification. As used herein, the terms "comprises," "comprising," "includes," "including." "has," "having." "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment." etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about." "substantially." "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    establishing a transmission performance database, wherein the transmission performance database comprises historical performance data related to transmission of data across a plurality of data channels of a network;
    establishing a chunk size adjustment schedule based on the historical performance data stored on the transmission performance database;
    defining an initial data chunk size for a first data object transmitted across a first data channel of the plurality data channels of the network, wherein the initial data chunk size is defined according to the chunk size adjustment schedule;
    transmitting the first data object across the first data channel according to the initial data chunk size;
    collecting performance data for the first data channel data and storing the performance data for the first data channel on the performance database;
    evaluating transmission performance of the first data channel based at least in part on the performance data of the first data channel;
    generating a recommendation to adjust the initial data chunk size of the first data object based on the transmission performance of the first data channel; and
    adjusting, upon acceptance of the recommendation, the initial data chunk size based at least in part on the recommendation.

2. The computer-implemented method of claim 1, wherein adjusting the initial data chunk size comprises increasing the initial data chunk size.

3. The computer-implemented method of claim 1, wherein the method further comprises:
    defining an initial data chunk size for a second data object transmitted across a second data channel of the plurality data channels of the network;
    transmitting the second data object across the second data channel according to the initial data chunk size for the second data object transmitted across the second data channel;
    collecting performance data for the second data channel data and storing the performance data for the second data channel on the performance database;
    evaluating transmission performance of the second data channel based at least in part on the performance data of the second data channel;
    generating a recommendation to adjust the initial data chunk size of the second data object based on the transmission performance of the second data channel; and
    upon acceptance of the recommendation, adjusting the initial data chunk size of the second data object based at least in part on the recommendation.

4. The computer-implemented method of claim 3, wherein adjusting the initial chunk size for the first data object comprises incrementing the initial data chunk size by a different amount than incrementing the initial data chunk size for the second data object.

5. The computer-implemented method of claim 1, further comprising training a machine learning algorithm to increment data chunk size based at least in part on historical performance data stored on the transmission performance database.

6. The computer-implemented method of claim 1, further comprising dynamically adjusting data chunk size based at least in part on historical performance data stored on the transmission performance database.

7. The computer-implemented method of claim 1, further comprising adjusting data chunk size according to a predetermined schedule.

8. The computer-implemented method of claim 1, wherein evaluating transmission performance of the first data channel comprises comparing at least one performance metric against a performance metric threshold, and upon a determination that the at least one performance metric meets the performance metric threshold, generating a recommendation to increase a current data chunk size.

9. A computer program product comprising one or more computer readable storage media, and program instructions collectively stored on the one or more computer readable storage media, the program instructions executable by a processor to cause the processor to perform operations comprising:
    establishing a transmission performance database, wherein the transmission performance database comprises historical performance data related to transmission of data across a plurality of data channels of a network;

establishing a chunk size adjustment schedule based on the historical performance data stored on the transmission performance database;

defining an initial data chunk size for a first data object transmitted across a first data channel of the plurality data channels of the network, wherein the initial data chunk size is defined according to the chunk size adjustment schedule;

transmitting the first data object across the first data channel according to the initial data chunk size;

collecting performance data for the first data channel data and storing the performance data for the first data channel on the performance database;

evaluating transmission performance of the first data channel based at least in part on the performance data of the first data channel;

generating a recommendation to adjust the initial data chunk size of the first data object based on the transmission performance of the first data channel; and adjusting, upon acceptance of the recommendation, the initial data chunk size based at least in part on the recommendation.

10. The computer program product of claim 9, wherein the stored program instructions are stored in a computer readable storage device in a data processing system, and wherein the stored program instructions are transferred over the network from a remote data processing system.

11. The computer program product of claim 9, wherein the stored program instructions are stored in a computer readable storage device in a server data processing system, and wherein the stored program instructions are downloaded in response to a request over the network to a remote data processing system for use in a computer readable storage device associated with the remote data processing system, further comprising:

program instructions to meter use of the program instructions associated with the request; and program instructions to generate an invoice based on the metered use.

12. The computer program product of claim 9, wherein adjusting the initial data chunk size comprises increasing the initial data chunk size.

13. The computer program product of claim 9, further comprising:

defining an initial data chunk size for a second data object transmitted across a second data channel of the plurality data channels of the network;

transmitting the second data object across the second data channel according to the initial data chunk size for the second data object transmitted across the second data channel;

collecting performance data for the second data channel data and storing the performance data for the second data channel on the performance database;

evaluating transmission performance of the second data channel based at least in part on the performance data of the second data channel;

generating a recommendation to adjust the initial data chunk size of the second data object based on the transmission performance of the second data channel; and upon acceptance of the recommendation, adjusting the initial data chunk size of the second data object based at least in part on the recommendation.

14. The computer program product of claim 13, wherein adjusting the initial chunk size for the first data object comprises incrementing the initial data chunk size by a different amount than incrementing the initial data chunk size for the second data object.

15. The computer program product claim 9, further comprising training a machine learning algorithm to increment data chunk size based at least in part on historical performance data stored on the transmission performance database.

16. The computer program product of claim 9, further comprising dynamically adjusting data chunk size based at least in part on historical performance data stored on the transmission performance database.

17. A computer system comprising a processor and one or more computer readable storage media, and program instructions collectively stored on the one or more computer readable storage media, the program instructions executable by the processor to cause the processor to perform operations comprising:

establishing a transmission performance database, wherein the transmission performance database comprises historical performance data related to transmission of data across a plurality of data channels of a network;

establishing a chunk size adjustment schedule based on the historical performance data stored on the transmission performance database;

defining an initial data chunk size for a first data object transmitted across a first data channel of the plurality data channels of the network, wherein the initial data chunk size is defined according to the chunk size adjustment schedule;

transmitting the first data object across the first data channel according to the initial data chunk size;

collecting performance data for the first data channel data and storing the performance data for the first data channel on the performance database;

evaluating transmission performance of the first data channel based at least in part on the performance data of the first data channel;

generating a recommendation to adjust the initial data chunk size of the first data object based on the transmission performance of the first data channel; and adjusting, upon acceptance of the recommendation, the initial data chunk size based at least in part on the recommendation.

18. The computer system of claim 17, wherein adjusting the initial data chunk size comprises increasing the initial data chunk size.

19. The computer system of claim 17, further comprising training a machine learning algorithm to increment data chunk size based at least in part on historical performance data stored on the performance database.

20. The computer system of claim 19, further comprising adjusting data chunk size according to a predetermined schedule.

* * * * *